United States Patent [19]

Kouno

[11] Patent Number: 4,560,930
[45] Date of Patent: Dec. 24, 1985

[54] DISTANCE-MEASURING SYSTEM USING ORTHOGONAL MAGNETIC FIELD GENERATORS AND ORTHOGONAL MAGNETIC FIELD SENSORS

[76] Inventor: Tsutomu Kouno, 8-104, 8-ban, 6-chome, Tsurukawa, Machida-shi, Tokyo, Japan

[21] Appl. No.: 506,663

[22] Filed: Jun. 22, 1983

[30] Foreign Application Priority Data

Jun. 27, 1982 [JP] Japan ................... 57-110263

[51] Int. Cl.$^4$ ............... G01B 7/14; G01R 33/02
[52] U.S. Cl. .......................... 324/207; 324/247; 364/444
[58] Field of Search ............. 324/207, 208, 244, 247, 324/345, 334; 343/450, 458, 463–465; 364/444, 449

[56] References Cited

U.S. PATENT DOCUMENTS

| | | | |
|---|---|---|---|
| 3,983,474 | 9/1976 | Kuipers | 324/207 |
| 4,054,881 | 10/1977 | Raab | 324/244 |
| 4,362,992 | 12/1982 | Young et al. | 324/247 |
| 4,492,923 | 1/1985 | Byram | 324/247 X |

FOREIGN PATENT DOCUMENTS

| | | |
|---|---|---|
| 0021906 | 1/1981 | European Pat. Off. |
| 0028397 | 5/1981 | European Pat. Off. |
| 1073235 | 6/1967 | United Kingdom |
| 1222342 | 2/1971 | United Kingdom |
| 1577515 | 10/1980 | United Kingdom |
| 1582409 | 1/1981 | United Kingdom |

Primary Examiner—Gerard R. Strecker
Attorney, Agent, or Firm—Lowe, King, Price & Becker

[57] ABSTRACT

The separation between first and second points is determined. At the first point are first, second and third mutually orthogonal coils that are excited in sequence, so that first, second and third magnetic fields are sequentially derived. At the second point are first, second and third mutually orthogonal magnetic field sensors that respond to the first, second and third magnetic fields, respectively to derive responses indicative of the magnetic fields coupled to them. The derived responses are combined in accordance with:

$$\frac{1}{\sqrt[6]{(V11)^2 + (V12)^2 + (V13)^2 + (V21)^2 + (V22)^2 + (V23)^2 + (V31)^2 + (V32)^2 + (V33)^2}}$$

to derive the separation magnitude, where:
V11, V12 and V13 are responses of the first, second and third sensors while the first coil is excited;
V21, V22 and V23 are responses of the first, second and third sensors while the second coil is excited;
V31, V32 and V33 are responses of the first, second and third sensors while the third coil is excited.

A variable gain element responds to the responses derived from the sensors for selectively modifying the amplitude of signals transduced by the sensors. An analog to digital converter responds to the selectively modified signals as derived by the variable gain element for deriving a multi-bit digital output signal having a predetermined optimum range. In response to the magnitude of the multi-bit digital output signal the gain of the variable gain element is controlled to maintain the multi-bit digital output signal in the range.

8 Claims, 7 Drawing Figures

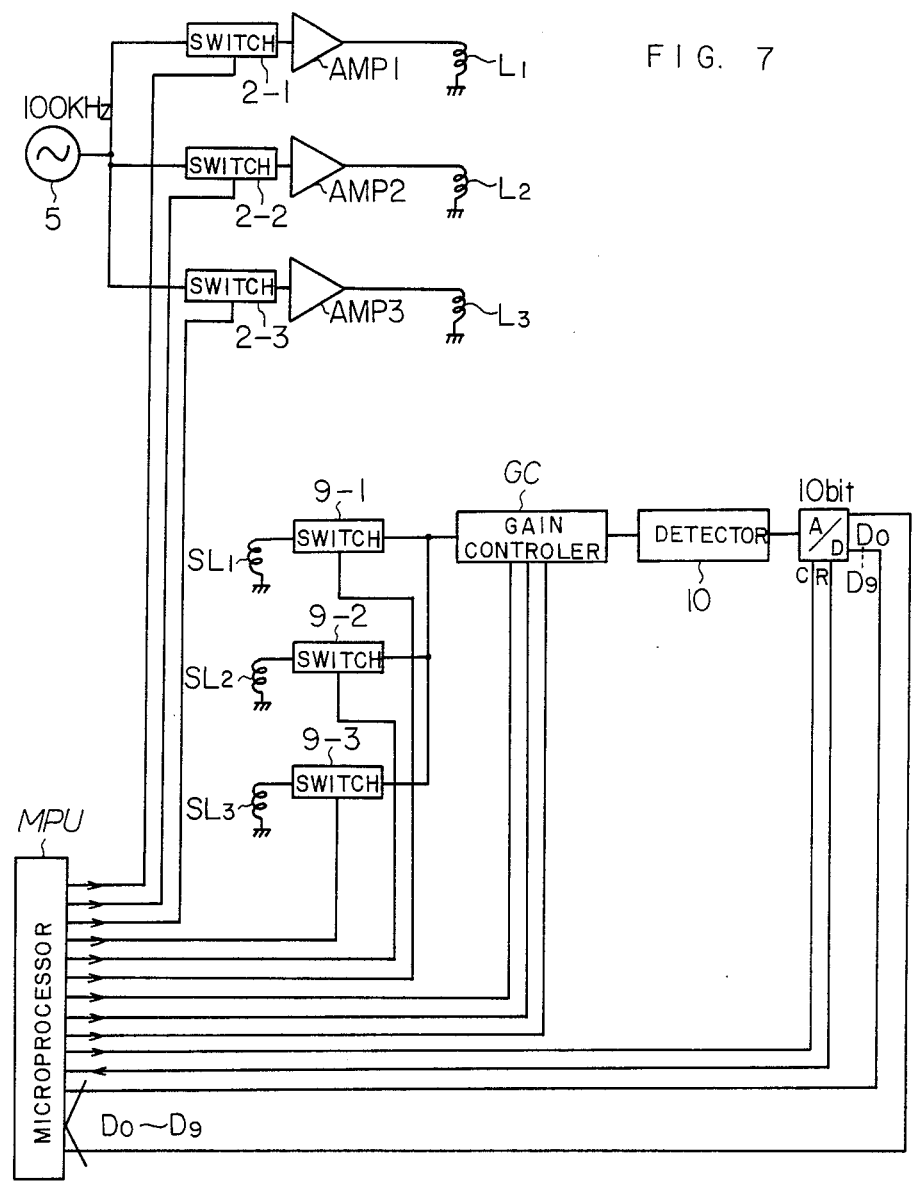

DISTANCE-MEASURING SYSTEM USING ORTHOGONAL MAGNETIC FIELD GENERATORS AND ORTHOGONAL MAGNETIC FIELD SENSORS

BACKGROUND ART

The present invention relates to a device for measuring the distance between two points and, more particularly, a sensor capable of measuring the distance by magnetic field means.

Various sensors have been developed along with the progress of micro-computers. Among these sensors are included the one for measuring the distance between two points.

The distance is conventionally measured by the angle of a rotary encoder arranged, as a distance-measuring sensor, so it is turned at a point where two sides of a triangle intersect. Assuming that the length of one side of the triangle is l, the distance can be obtained from $2 l \sin \theta/2$ wherein $\theta$ represents the angle formed by two sides of the triangle.

The distance is also measured using the capacitance of electrodes arranged at both ends of the distance to be measured. Assuming that the area of each electrode is s and that the distance between them is d, the capacity c is equal to $\epsilon s/d$, where $\epsilon$ represents the dielectric constant of a dielectric present between the electrodes. The distance d can be obtained from this equation $c = \epsilon s/d$.

The rotary encoder is limited in use because it specifies two points mechanically. The capacitance structure is likely to be influenced by ambient circumstances, thus making errors because of humidity, position of measuring person and so on.

DISCLOSURE OF INVENTION

The present invention is therefore intended to eliminate the drawbacks and the object of the present invention is to provide a distance-measuring sensor capable of measuring the distance between two points through the degree of magnetic coupling. The invention comprises at least one magnetic field generator means for generating a magnetic field, first, second and third transformer means positioned in the vicinity of the magnetic field generator means to transform a magnetic field generated by the magnetic field generator means to voltage. An operational processor responds to outputs of the transformer means to derive distance data from the magnetic field generator means as well as from the transformer means.

BRIEF DESCRIPTION OF DRAWINGS

FIG. 7 is a circuit diagram of a second embodiment of the present invention.

BEST MODE FOR CARRYING OUT THE INVENTION

Figure 1:
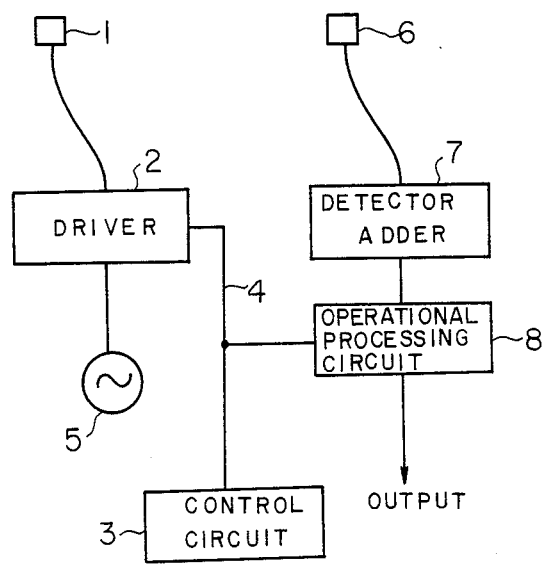
FIG. 1 is a block diagram of a first embodiment of the present invention.
Figure 2:
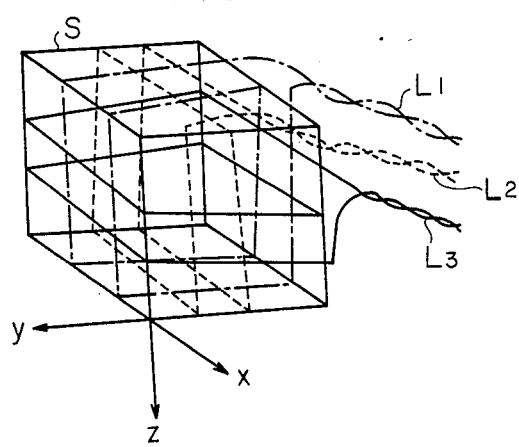
FIG. 2 is a schematic diagram of the physical construction of magnetic field generating and sensor coils used in the invention.
Figure 3:
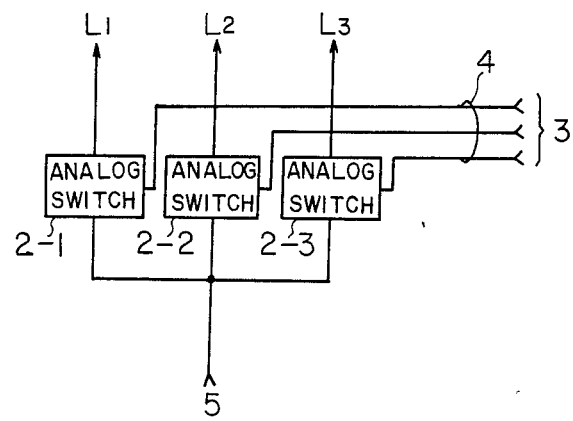
FIG. 3 is a block diagram of a driver used in the invention.

FIG. 1 is a circuit diagram of a first embodiment according to the present invention. A magnetic field generator 1 includes coils for generating magnetic fields in three directions. FIG. 2 is a schematic diagram of the physical structure of coils which form the magnetic field generator 1. Each of coils L1–L3 is wound twice around a cube s to generate a magnetic field in three directions. Coils L1–L3 respectively generate magnetic fields along axes x, y and z. The magnetic field generator 1 is connected to a driver 2, which selects the coils L1–L3 through a signal line 4 extending from a control circuit 3, to generate alternating signals derived from an oscillator 5. FIG. 3 is a circuit diagram of a driver. Inputs of analog switches 2-1-2-3 are connected to the oscillator 5 and control line 4 for switches 2-1—2-3 is connected to the control circuit 3. Outputs of the analog switches 2-1-2-3 are connected to the coils L1, L2 and L3 of the magnetic field generator 1. The analog switches 2-1, 2-2 and 2-3 selected by a signal on control line 4 are turned on to supply the alternating signals of the oscillator 5 to coils L1, L2 and L3, respectively, including coils SL1–SL3, having the same structure as coils L1, L2 and L3 of the magnetic field generator 1 shown in FIG. 2, detects a magnetic field in three directions.

Figure 4:
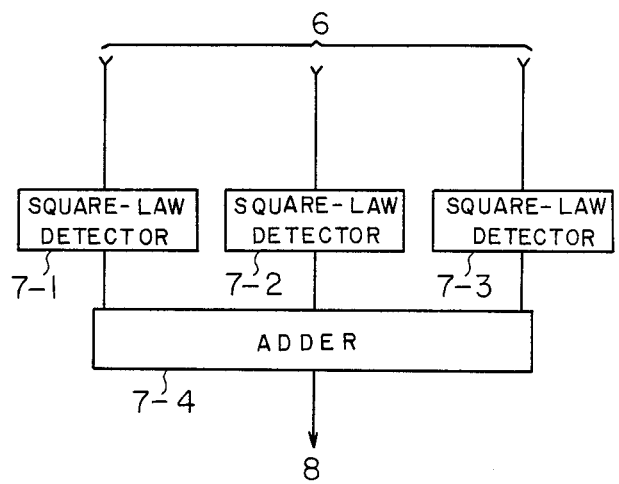
FIG. 4 is a block diagram of a detector used in the invention.
Figure 5:
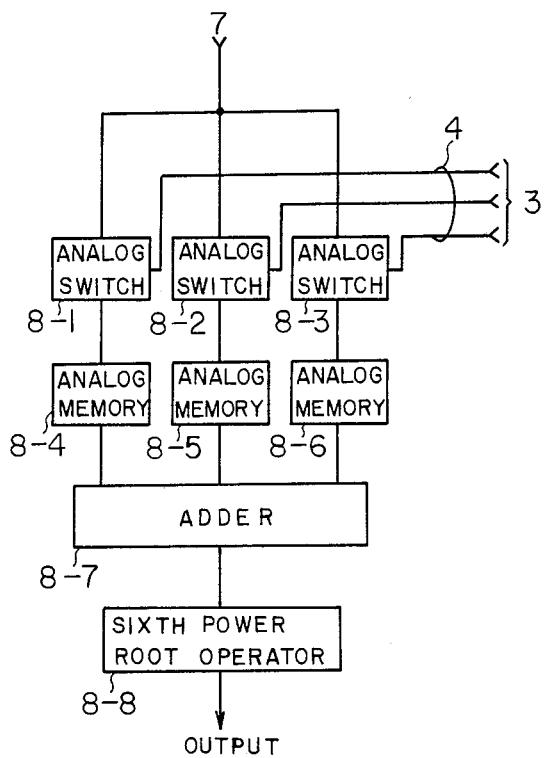
FIG. 5 is a block diagram of an operational processing circuit used in the invention.

Output signals of the sensor 6 are applied to a detector adder 7, which serves to square-law detect and add signals obtained from the sensor 6. FIG. 4 is a circuit diagram of the detector adder 7. Signals transduced by coils SL1–SL3 of the sensor 6 are applied to square-law detectors 7-1-7-3 which respectively derive signals representing the squares of the signals transduced by coils SL1–SL3. The output signals of the square-law detectors 7-1-7-3 are applied to and added together by adder 7-4, which derives an output proportional to a value obtained by squaring the peak magnitude quantity of the alternating-current magnetic field vector at the location of the sensor 6. Detector adder 7-4 derives several outputs in response to the magnetic fields generated by each of the magnetic field generating coils L1–L3. The outputs of the detector adder 7-4 are applied to and added together by operational process circuit 8. FIG. 5 is a circuit diagram of the operational process circuit 8.

In response to the switching operation of each of analog switches 2-1-2-3 of the driver 2, each of analog switches 8-1-8-3 is sequentially activated to an on condition. Outputs of the analog switches 8-1-8-3 are applied to analog memories 8-4-8-6. For example, in response to analog switches 8-1, 8-2 and 8-3 respectively being turned on in response to the switching operations of analog switches 2-1, 2-2 and 2-3 of the driver 2, outputs of the detector adder 7-4 obtained from the magnetic field generated by magnetic field generating coils L1–L3 are stored in the analog memories 8-4-8-6, respectively.

Outputs of analog memories 8-4-8-6 are applied to and added in adder 8-7. Thus adder 8-7 derives signals having values proportional to the sum of the squares of each of scalar quantities, at the location of the sensor 6, of the magnetic field generated in three directions in response to the magnetic field generating coils L1–L3.

Figure 6:
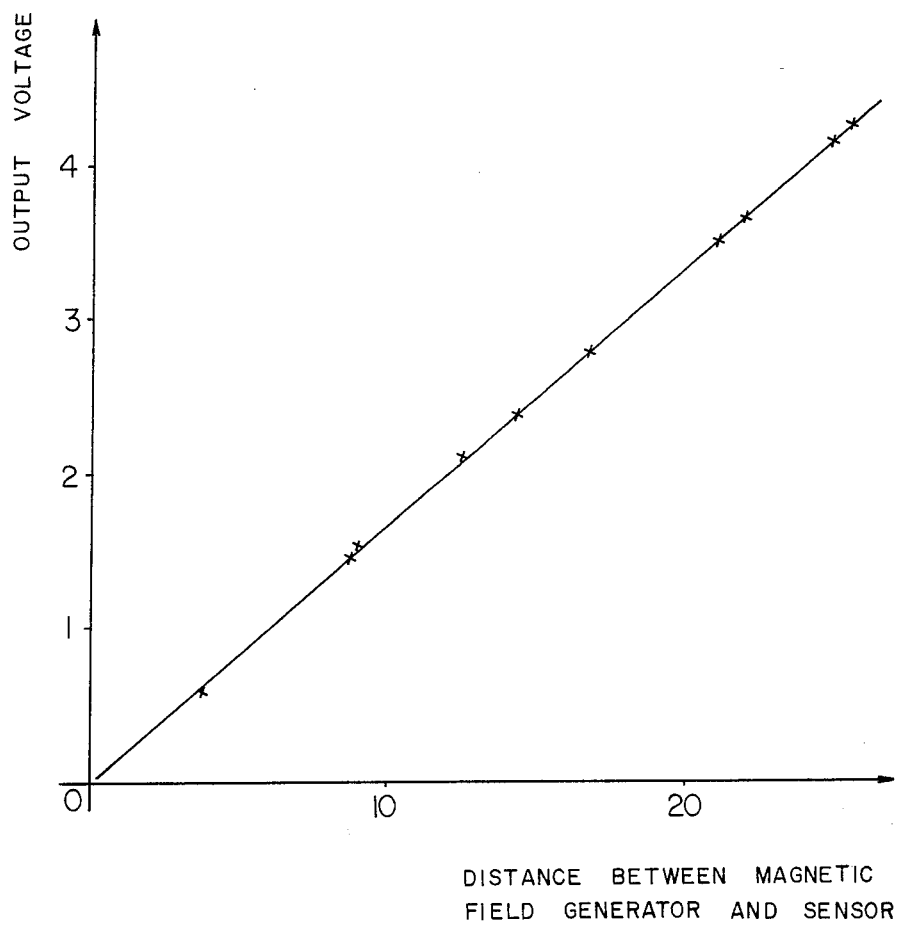
FIG. 6 is a characteristic curve relating distances to output voltages of operational means used in the invention.

The output of the adder 8-7 is applied to a sixth power root operation 8-8, which derives an output signal representing the reciprocal or inverse of the sixth power root of the input signal thereof. FIG. 6 is a characteristic curve relating the distance between the magnetic field generator 1 and the sensor 6 relative to the output voltage of the operator 8-8. The relation changes substantially linear. Namely, the output voltage of the operational process circuit 8 is proportional to the distance between the magnetic field generator 1 and the sensor 6 with oscillator 5 driving the generators at a frequency of 100 kHz. The sensor and the magnetic field generator are changed in direction at each of the points.

Referring to the first embodiment of the present invention shown in FIG. 1, detailed description is now made of the signals derived by the system, assuming that the amplitudes of the alternating signals derived by sensor coils SL1, SL2 and SL3 are respectively V11, V12 and V13 and that output oscillator 5 drives coil L1 at a frequency of 100 kHz. The signals having amplitudes V11, V12 and V13 are applied to, detected, and then squared by square-law detectors 7-1, 7-2 and 7-3, which respectively derive DC signals having magnitudes represented by $V11^2$, $V12^2$ and $V13^2$. The output signals of detectors 7-1, 7-2 and 7-3 are summed by the adder 7-4, which derives a DC output in accordance with $V11^2+V12^2+V13^2$. When the output of oscillator 5 is applied to the coil L1, the analog switch 8-1 is turned on, causing the data values $V11^2+V12^2+V13^2$ to be stored in the analog memory 8-4. Next assume that sensor coils SL1, SL2 and SL3 respectively derive a.c. signals having amplitudes V21, V22 and V23 while the output of oscillator 5 is applied to the coil L2 of the magnetic field generator. A.c. signals having amplitudes V21, V22 and V23 are similarly square-law detected by the square-law detectors 7-1, 7-2 and 7-3 and then added by the adder 7-4, which derives a D.C. output representing $V21^2+V22^2+V23^2$. Since the analog switch 8-2 is turned on at this time, the data value $V21^2+V22^2+V23^2$ is stored in the analog memory 8-5. Sensor coils SL1, SL2 and SL3 respectively derive a.c. signals having values of V31, V32 and V33 when the output of oscillator 5 is applied to the coil L3 of the magnetic field generator; the data value $V31^2+V32^2+V33^2$ is stored in the analog memory 8-6 in response thereto.

Outputs of the analog memories 8-4, 8-5 and 8-6 are applied to the adder 8-7 so that output of the adder 8-7 is a signal having a magnitude representing $V11^2+V12^2+V13^2+V21^2+V22^2+V23^2+V31^2+V32^2+V33^2$. The output of adder 8-7 is processed by sixth power root operator 8-8 to derive a signal value representing the sixth power root thereof; the reciprocal or inverse of the sixth power is derived so adder 8-8 produces an output signal in accordance with:

$$OUT = \frac{1}{\sqrt[6]{V11^2+V12^2+V13^2+V21^2+V22^2+V23^2+V31^2+V32^2+V33^2}}$$

All of the above-described circuits are intended to operate on the inputs thereof to derive resultant output voltage values. These output voltage values are thus multiplied by specified constants, assumed to be one for clarity of description. Thus, the ordinate axis in FIG. 6 also represents voltage values.

FIG. 7 is a circuit diagram of a second embodiment of the present invention. Oscillator 5, having an output frequency of 100 kHz, drives analog switches 2-1, 2-2 and 2-3, having outputs amplified by amplifiers AMP1, AMP2 and AMP3, which in turn drive coils L1, L2 and L3, having the same construction as coils L1–L3, FIG. 2. Control terminals of the analog switches 2-1, 2-2 and 2-3 are connected to a micro-processor unit MPU. Sensor coils SL1, SL2 and SL3, having the same construction as coils L1, L2 and L3, are respectively connected to analog switches 2-1, 2-2 and 2-3. Output signals of analog switches 9-1, 9-2 and 9-3 are applied to a gain controller GC. Control terminals of the analog switches 9-1, 9-2 and 9-3 are connected to the micro-processor unit MPU, which also supplies control signals to gain controller GC, having an output signal that is coupled to detector 10. The output signal of gain controller GC is applied to detector 10, having a DC output signal representing the peak values of the gain controller a.c. output; the DC output of detector 10 is supplied to 10-bit analog/digital converter A/D. Analog/digital converter A/D derives a digital data output signal that is applied to the micro-processor unit MPU.

In operation, analog switch 2-1 is turned on by microprocessor unit MPU, causing an alternating-current magnetic field of 100 kHz to be generated by coil L1. This magnetic field is coupled to sensor coils SL1, SL2 and SL3, which respond to it to generate three separate alternating-current voltages. Micro-processor unit MPU turns on analog switch 9-1 to enable the a.c. voltage transduced by coil SL1 to be measured. The a.c. voltage generated by coil SL1 is amplified by gain controller GC, thence applied to the analog/digital converter A/D via detector 10. The converting process of analog/digital converter A/D starts when terminal C thereof receives a signal from the micro-processor unit MPU. When each conversion has been completed, converter A/D supplies a signal to micro-processor unit MPU via terminal R of the converter.

When a 10-bit output signal analog/digital converter A/D is not in a specified range, the micro-processor unit MPU changes the gain of gain controller GC to bring the converter output into the specified range. Gain controller GC includes a three-stage amplifier and eight different gains that are multiples of 1–8×64 ×512; the selected range of controller GC is determined by the value of control signals applied to the controller by micro-processor unit MPU. Namely, the gain is selected as one of 1, 8, 64, 512, 4096, 32768, 262144 and 2097152. When the data output signal D of analog/digital converter A/D is between the binary values "0001111111" and "1111111110", gain controller GC has an optimum gain. If the output of converter A/D is less than and greater than this range, the gain of controller GC is increased and decreased respectively.

Assume, e.g., that the gain of controller GC is 512 and the output of the analog/digital converter A/D is "0001011010", a value less than the lower limit of the "0001111111". Micro-processor MPU responds to the "0001011010" value at the output of converter A/D to adjust the gain of controller GC so it is 4096. As a result, the output of analog/digital converter A/D becomes "1011010xxx" wherein the digit x represents either "0" or "1", depending on the output voltage of detector 10. If the output of converter A/D is "1111111111", the gain of controller GC is decreased from 512 to 64 and a measurement of the output of the selected sensor SL1–SL3 is made again by analog/digital converter A/D. If the output of converter A/D is still "1111111111", the gain of controller GC is decreased again, this time to 32, and operation similar to that already described above is repeated. When the resultant output of converter A/D obtained during the re-measurement is in the specified range, it is picked up by the micro-processor unit MPU.

This operation enables the mantissa portion of the value associated with the signal at the input of gain controller GC to be obtained in response to the output of analog/digital converter A/D and index portion of the value to be obtained as a result of the magnitude of the signal controlling the gain of controller GC.

The operations described above are similarly performed in connection with sensor coils SL2 and SL3. Also, analog switches 2-2 and 2-3 are sequentially closed to drive coils L2 and L3, causing similar operations to be performed. No more than two of the analog switches 2-1, 2-2 and 2-3 are closed simultaneously. Similarly, no more than two of analog switches 9-1, 9-2 and 9-3 are closed simultaneously. The operation described above enables nine digital data signals to be supplied to micro-processor unit MPU. The micro-processor unit MPU squares each of the nine digital data signals, adds them, calculates the sixth power root of the resultant, and derives the reciprical or inverse number, thus enabling the distance between the magnetic field generator 1 and the sensor 6 to be obtained. Since the derived data differs depending upon the number of turns and the bulkiness of coils of the magnetic field generator 1 and of the sensor 6, they must be multiplied by an appropriate proportionality constant.

The micro-processor unit MPU derives a digital data signal representing the separation of coils L1–L3 from coils SL1–SL3. The separation representing signal is displayed using an eight-segment LED (not shown), for example.

While the above-described embodiments of the present invention employ sensor coils, it is to be understood that Hall elements and the like may be used. When Hall elements are used, the magnetic field generator may generate a DC field. While air cores are illustrated on the drawing, cores having magnetic cores may be used to enhance sensitivity.

Three magnetic field generators are employed in the present invention, to reduce the variable error which depending upon the direction of the magnetic field generators. If the magnetic field generators are increased in number, to, e.g., six or twelve, greater measurement accuracy is attained.

As described above, the present invention enables the distance between two points in a three dimensional space to be obtained. The present invention further enables a certain value to be obtained independent of the directions in which the sensors and the generators are directed.

What is claimed is:

1. A magnetic field responsive distance indicating system comprising a magnetic field generator means for generating an alternating magnetic field, said generator means including first, second and third magnetic field generator coils arranged adjacent and perpendicular to one another, sensor means for converting the alternating magnetic fields generated by the first, second and third magnetic field generator coils into alternating voltages, the sensor means including first, second and third magnetic fields to signal generating converter means arranged adjacent and perpendicular to one another, first, second and third square law means for squaring output signals of said first, second and third converter means applied thereto, a first adder means responsive to the outputs of said first, second and third square law means for deriving a sum signal, first second and third driver means for sequentially driving said first, second and third magnetic field generator coils, a first memory means for storing the sum signal derived by said first adder means while the first magnetic field generator coil is driven by said first driver means, a second memory means for storing the sum signal derived by said first adder means while the second magnetic field generator coil is driven by said second driver means, a third memory means for storing the sum signal derived by said first adder means while the third magnetic field generator coil is driven by said third driver means, a second adder means for adding the sum signals stored in said first, second and third memory means to derive a summation signal, and means for obtaining the six power root of the summation signal derived from said second adder means to convert it into a signal having a value representing the reciprocal of the sixth root of the summation, whereby a signal proportional to the distance between said magnetic field generator means and said sensor means is derived from said operational means.

2. The system of claim 1 wherein said first, second and third square law means comprise first, second and third detector circuits for detecting the signals derived from said first, second and third converter means to convert them into DC signals, and first, second and third circuits for respectively squaring the magnitudes of DC signals derived by said first, second and third detector circuits.

3. A magnetic field responsive distance indicating system comprising a magnetic field generator means for generating an alternating magnetic field, said generator means including first, second and third magnetic field generator coils arranged adjacent and perpendicular to one another, first, second and third converter means for converting the alternating magnetic fields generated by said first, second and third magnetic field generator coils into alternating voltages, said first, second and third converter means being positioned adjacent and perpendicular to one another, first, second and third driver means for sequentially driving said first, second and third magnetic field generator coils, first, second and third selector means for selecting one output of said first, second and third converter means for a time period during which each of said first, second and third magnetic field generator coils is driven and for applying the selected output as a signal input to a variable gain device for varying the output of said first, second and third selector means which has been selected by said first, second and third selector means for the time period during which each of said magnetic field generator coils is driven by an alternating voltage value which is in a specific range, detector means for converting the alternating voltage derived from the gain controller and defined in the specific range into a DC voltage, A/D converter means for converting the DC voltage output of said detector means into a digital output signal, and a microprocessor responsive to the digital output signal of said A/D converter means for squaring and adding nine digital data values selected during each time period while each of said first, second and third magnetic field generator coils is driven, said microprocessor controlling the gain of the variable gain device as a function of the range of the alternating voltage value, said microprocessor responding to the nine digital data value to derive an indication of the reciprocal of the sixth power root of the sum thereof, said indication being proportional to the distance between said magnetic field generator means.

4. The system of claim 2 wherein the gain of said variable gain device is controlled by said microprocessor such that the output of said A/D converter means is a digital value in said specific range, said microprocessor carrying out operations using the digital signal derived from said A/D converter means as a variable number section and a gain control signal for said variable gain device as an index section.

5. Apparatus for determining the separation between first and second points comprising first, second and third mutually orthogonal coils at the first points, means for exciting said first, second and third coils in sequence so that first, second and third magnetic fields are sequentially derived; first, second and third mutually orthogonal magnetic field sensors at the second point responsive to the first, second and third magnetic fields, the first, second and third sensors respectively deriving responses indicative of the magnetic fields coupled to them, means responsive to the derived responses for deriving signals proportional to $(V11)^2$, $(V12)^2$, $(V13)^2$, $(V21)^2$, $(V22)^2$, $(V23)^2$, $(V31)^2$, $(V32)^2$ and $(V33)^2$, where:

$V11$ = the response of the first sensor while the first coil is excited;
$V12$ = the response of the second sensor while the first coil is excited;
$V13$ = the response of the third sensor while the first coil is excited;
$V21$ = the response of the first sensor while the second coil is excited;
$V22$ = the response of the second sensor while the second coil is excited;
$V23$ = the response of the third sensor while the second coil is excited;
$V31$ = the response of the first sensor while the third coil is excited;
$V32$ = the response of the second sensor while the third coil is excited;
$V33$ = the response of the third sensor while the third coil is excited, and means for combining the signals in accordance with:

$$\frac{1}{\sqrt[6]{(V11)^2 + (V12)^2 + (V13)^2 + (V21)^2 + (V22)^2 + (V23)^2 + (V31)^2 + (V32)^2 + (V33)^2}}$$

to derive the separation magnitude.

6. The apparatus of claim 5 further including a variable gain element responsive to the responses derived from the sensors for selectively modifying the amplitude of signals transduced by the sensors, an analog to digital converter responsive to the selectively modified signals as derived by the variable gain element for deriving a multi-bit digital output signal having a predetermined optimum range, means responsive to the magnitude of the multi-bit digital output signal for controlling the gain of the variable gain element to maintain the multi-bit digital output signal in the range, the magnitude of the multi-bit output signal controlling the magnitude of the indicated separation.

7. The apparatus of claim 6 wherein the gain control means controls the variable gain element gain in steps that are powers of two, the gain of the variable gain element determining an index for a digital indication of the separation, the multi-bit digital output signal determining a mantissa for the digital indication of the separation.

8. The apparatus of claim 6 further including means for selectively coupling the responses of the three sensors individually to the variable gain device, and means responsive to the multi-bit digital output signal for repeatedly coupling the response from the same sensor to the variable gain device until the multi-bit digital output signal is in the optimum range.

* * * * *